(12) United States Patent
Pidcock et al.

(10) Patent No.: US 10,295,189 B2
(45) Date of Patent: May 21, 2019

(54) COMBUSTION CHAMBER ARRANGEMENT

(71) Applicant: ROLLS-ROYCE PLC, London (GB)

(72) Inventors: Anthony Pidcock, Derby (GB); Paul Chandler, Birmingham (GB)

(73) Assignee: ROLLS-ROYCE plc, London (GB)

( * ) Notice: Subject to any disclaimer, the term of this patent is extended or adjusted under 35 U.S.C. 154(b) by 686 days.

(21) Appl. No.: 14/699,294

(22) Filed: Apr. 29, 2015

(65) Prior Publication Data

US 2015/0330635 A1     Nov. 19, 2015

(30) Foreign Application Priority Data

May 16, 2014 (GB) .................................. 1408690.4

(51) Int. Cl.
*F23R 3/28*     (2006.01)
*F23R 3/00*     (2006.01)
(Continued)

(52) U.S. Cl.
CPC .............. *F23R 3/286* (2013.01); *F23R 3/002* (2013.01); *F23R 3/10* (2013.01); *F23R 3/14* (2013.01);
(Continued)

(58) Field of Classification Search
CPC .... F23R 3/002; F23R 3/02; F23R 3/04; F23R 3/10; F23R 3/14; F23R 3/26; F23R 3/60; F23R 3/50; F23R 3/286
See application file for complete search history.

(56) References Cited

U.S. PATENT DOCUMENTS 2,720,080 A    10/1955    Oulianoff et al.
3,916,619 A    11/1975    Masai et al.
(Continued)

FOREIGN PATENT DOCUMENTS

CH        252 271 A     12/1947
CN    101799174 A     8/2010
(Continued)

OTHER PUBLICATIONS

Feb. 9, 2017 Office Action issued in European Patent Application No. 15 165 562.8.
(Continued)

*Primary Examiner* — Gerald L Sung
*Assistant Examiner* — William L Breazeal
(74) *Attorney, Agent, or Firm* — Oliff PLC (57) ABSTRACT

A combustion chamber arrangement comprises an annular combustion chamber arranged radially between an inner casing and an outer casing. The combustion chamber comprises a metering wall arranged upstream of an upstream wall and the upstream wall and the metering wall each have a plurality of circumferentially spaced apertures. Each aperture in the metering wall is aligned with a respective one of the apertures in the upstream wall. A fuel injector is arranged in each of the apertures in the upstream wall. An air swirler is aligned with a respective one of the fuel injectors. Each air swirler is arranged between the upstream wall and the metering wall. The metering wall has a plurality of metering holes arranged to provide a controlled supply of air to each of the air swirlers and the combustion chamber is secured to the inner casing by a mounting feature.

23 Claims, 6 Drawing Sheets

(51) Int. Cl.
*F23R 3/10* (2006.01)
*F23R 3/14* (2006.01)
*F23R 3/50* (2006.01)
*F23R 3/60* (2006.01)

(52) U.S. Cl.
CPC ............. *F23R 3/50* (2013.01); *F23R 3/60* (2013.01); *Y02T 50/675* (2013.01)

(56) References Cited

U.S. PATENT DOCUMENTS

| | | | |
|---|---|---|---|
| 3,972,182 A | | 8/1976 | Salvi |
| 4,487,015 A | | 12/1984 | Slattery et al. |
| 4,606,190 A | | 8/1986 | Greene et al. |
| 5,331,815 A | * | 7/1994 | Reinhold, Jr. ............ F23R 3/04 60/39.11 |
| 5,524,430 A | * | 6/1996 | Mazeaud ................ F23R 3/283 60/752 |
| 5,966,937 A | | 10/1999 | Graves |
| 6,381,964 B1 | | 5/2002 | Pritchard, Jr. et al. |
| 6,532,742 B2 | | 3/2003 | Scarinci et al. |
| 7,062,920 B2 | | 6/2006 | McMasters et al. |
| 7,065,972 B2 | | 6/2006 | Zupanc et al. |
| 2002/0162333 A1 | | 11/2002 | Zelina |
| 2007/0186558 A1 | | 8/2007 | De Sousa et al. |
| 2009/0056337 A1 | * | 3/2009 | Commaret ................ F02C 3/14 60/740 |
| 2009/0212139 A1 | * | 8/2009 | Thomson .................. F23R 3/28 239/590 |
| 2013/0081270 A1 | | 4/2013 | Patterson et al. |
| 2013/0192262 A1 | * | 8/2013 | Eastwood ............... F23R 3/002 60/805 |
| 2014/0083105 A1 | * | 3/2014 | Kobayashi ............... F23R 3/14 60/746 |

FOREIGN PATENT DOCUMENTS

| | | |
|---|---|---|
| CN | 101949551 A | 1/2011 |
| EP | 0724119 A2 | 7/1996 |
| EP | 0 724 119 A3 | 1/1999 |
| FR | 1415215 A | 10/1965 |

OTHER PUBLICATIONS

Oct. 14, 2015 Search Report issued in European Patent Application No. 15 16 5562.
Oct. 28, 2014 Search Report issued in Application No. GB1408690.4.

* cited by examiner

COMBUSTION CHAMBER ARRANGEMENT

FIELD OF THE INVENTION

The present disclosure relates to a combustion chamber arrangement and in particular to combustion chamber arrangement of a gas turbine engine.

BACKGROUND TO THE INVENTION

Gas turbine engine combustion chambers generally operate using rich burn or lean burn. The fuel injectors of the gas turbine engine combustion chamber have a certain diameter and the apertures in the upstream end wall are sized accordingly to receive the fuel injectors. Currently the fuel injectors of gas turbine engine combustion chambers are rich burn fuel injectors. Rich burn fuel injectors generally comprise two, or three, coaxial air swirlers to atomise the fuel supplied into the fuel injector.

However, gas turbine engine combustion chambers are being designed to use lean burn fuel injectors to reduce the emissions of oxides of nitrogen, NOx, and oxides of sulphur, SOx, from the gas turbine engine. Lean burn fuel injectors generally comprise four, or five, coaxial air swirlers to atomise a pilot fuel supply and a main fuel supply. Lean burn fuel injectors have much larger diameters than the rich burn fuel injectors.

Currently combustion chambers have dump diffusers to supply air to the combustion chamber and the combustion chambers have inner and outer annular cowlings to supply air to the lean burn fuel injectors.

It is desirable to ensure that a uniform quantity of air is supplied to each of the air swirlers in each of the lean burn fuel injectors in order to control the emissions of NOx in the combustion chamber. It is desirable to ensure that a uniform quantity of air is supplied to the outer air swirler of each lean burn injector in order to control the emissions of oxides of nitrogen, NOx, in the combustion chamber.

It is believed that the use of the inner and outer annular cowlings to supply air to the lean burn fuel injectors does not ensure that a uniform quantity of air is supplied to the outer air swirler of the fuel injectors in order to control the emissions of oxides of nitrogen, NOx, in the combustion chamber.

Therefore the present disclosure seeks to provide a novel combustion chamber arrangement which reduces or overcomes the above mentioned problem.

STATEMENTS OF INVENTION

Accordingly the present disclosure provides a combustion chamber arrangement comprising an outer casing, an inner casing and an annular combustion chamber, the annular combustion chamber is arranged radially between the inner casing and the outer casing, the annular combustion chamber comprising an inner annular wall, an outer annular wall, an upstream end wall, a plurality of fuel injectors, a metering wall and a plurality of air swirlers, the metering wall being arranged upstream of the upstream end wall, the upstream end wall having a plurality of circumferentially spaced apertures, the metering wall having a plurality of circumferentially spaced apertures, each aperture in the metering wall being aligned with a respective one of the apertures in the upstream end wall, each fuel injector being arranged in a respective one of the apertures in the upstream end wall, each air swirler being aligned with a respective one of the fuel injectors, each air swirler being arranged axially between the upstream end wall and the metering wall, the metering wall having a plurality of metering holes arranged to provide a controlled supply of air to each of the air swirlers, the annular combustion chamber being secured to the inner casing or the outer casing by a mounting feature, the upstream end wall or the metering wall being secured to the inner casing or the outer casing by the mounting feature, the mounting feature being annular, the mounting feature having a plurality of metering apertures to supply air to an annular chamber between the inner casing and the annular combustion chamber or to an annular chamber between the outer casing and the annular combustion chamber.

The upstream end wall and the metering wall defining a chamber, the metering holes in the metering wall being arranged to supply air to the chamber and the chamber is arranged to supply air to each of the air swirlers.

The annular combustion chamber may comprise a plurality of sealing rings, each fuel injector locating in a respective one of the sealing rings, each sealing ring carrying the associated air swirler of the fuel injector.

Each air swirler may be a radial flow air swirler.

Each sealing ring may have a radially extending flange and the upstream end of the vanes of the radial flow air swirler being secured to the radially extending flange of the sealing ring and the downstream ends of the vanes of the radial flow air swirler being secured to an L-shaped member.

The upstream end wall may be secured to the inner casing by the mounting feature and the metering wall being secured to the upstream end wall.

Alternatively the metering wall may be secured to the inner casing by the mounting feature and the upstream end wall being secured to the metering wall.

The upstream end wall may be secured to the outer casing by the mounting feature and the metering wall being secured to the upstream end wall.

Alternatively the metering wall may be secured to the outer casing by the mounting feature and the upstream end wall being secured to the metering wall.

The mounting feature may be annular and comprises a flange to secure the annular combustion chamber to the inner casing.

The mounting feature may be arranged at an angle to the radial direction to increase the surface area of the mounting feature.

The annular combustion chamber may be secured to the outer casing by a second mounting feature.

The upstream end wall may be secured to the outer casing by the second mounting feature and the metering wall being secured to the upstream end wall.

Alternatively the metering wall may be secured to the outer casing by the second mounting feature and the upstream end wall being secured to the metering wall.

The second mounting feature may be annular and comprises a flange arranged to locate in a slot in the outer casing to allow relative axial movement between the outer casing and the annular combustion chamber.

The second mounting feature may have a plurality of metering apertures to supply air to an annular chamber between the outer casing and the annular combustion chamber.

The second mounting feature may be arranged at an angle to the radial direction to increase the surface area of the second mounting feature.

The second mounting feature may be annular and comprises a flange and a plurality of axially extending flexible mounting members secured to the outer casing.

The upstream end wall and the mounting feature may be integral, e.g. one piece, or the metering wall and the mounting feature may be integral, e.g. one piece.

The upstream end wall, the mounting feature and the second mounting feature may be integral, e.g. one piece, or the metering wall, the mounting feature and the second mounting feature may be integral, e.g. one piece.

The upstream end wall may have an inner axially extending flange and an outer axially extending flange, the metering wall has an inner axially extending flange and an outer axially extending flange, the inner annular wall being secured to the inner axially extending flanges of the upstream end wall and the metering wall and the outer annular wall being secured to the outer axially extending flanges of the upstream end wall and the metering wall.

The fuel injectors may be lean burn fuel injectors.

The combustion chamber arrangement may further comprise a heat shield, the heat shield being arranged downstream of the upstream end wall.

The combustion chamber arrangement may be provided in a gas turbine engine.

The gas turbine engine may be an aero gas turbine engine, a marine gas turbine engine, an industrial gas turbine engine or an automotive gas turbine engine.

The aero gas turbine engine may be a turbofan gas turbine engine, a turbo propeller gas turbine engine, a turbo shaft gas turbine engine or a turbojet gas turbine engine.

The present disclosure provides also provides a combustion chamber arrangement comprising an outer casing, an inner casing and an annular combustion chamber, the annular combustion chamber is arranged radially between the inner casing and the outer casing, the annular combustion chamber comprising an inner annular wall, an outer annular wall, an upstream end wall, a plurality of fuel injectors, a metering wall and a plurality of radial flow air swirlers, the metering wall being arranged upstream of the upstream end wall, the upstream end wall having a plurality of circumferentially spaced apertures, the metering wall having a plurality of circumferentially spaced apertures, each aperture in the metering wall being aligned with a respective one of the apertures in the upstream end wall, each fuel injector being arranged in a respective one of the apertures in the upstream end wall, each radial flow air swirler being aligned with a respective one of the fuel injectors, each radial flow air swirler being arranged axially between the upstream end wall and the metering wall, the metering wall having a plurality of metering holes arranged to provide a controlled supply of air to each of the radial flow swirlers and the annular combustion chamber being secured to the inner casing or the outer casing by a mounting feature.

BRIEF DESCRIPTION OF THE DRAWINGS

The present invention will be more fully described by way of example with reference to the accompanying drawings, in which:—

DETAILED DESCRIPTION

Figure 1:
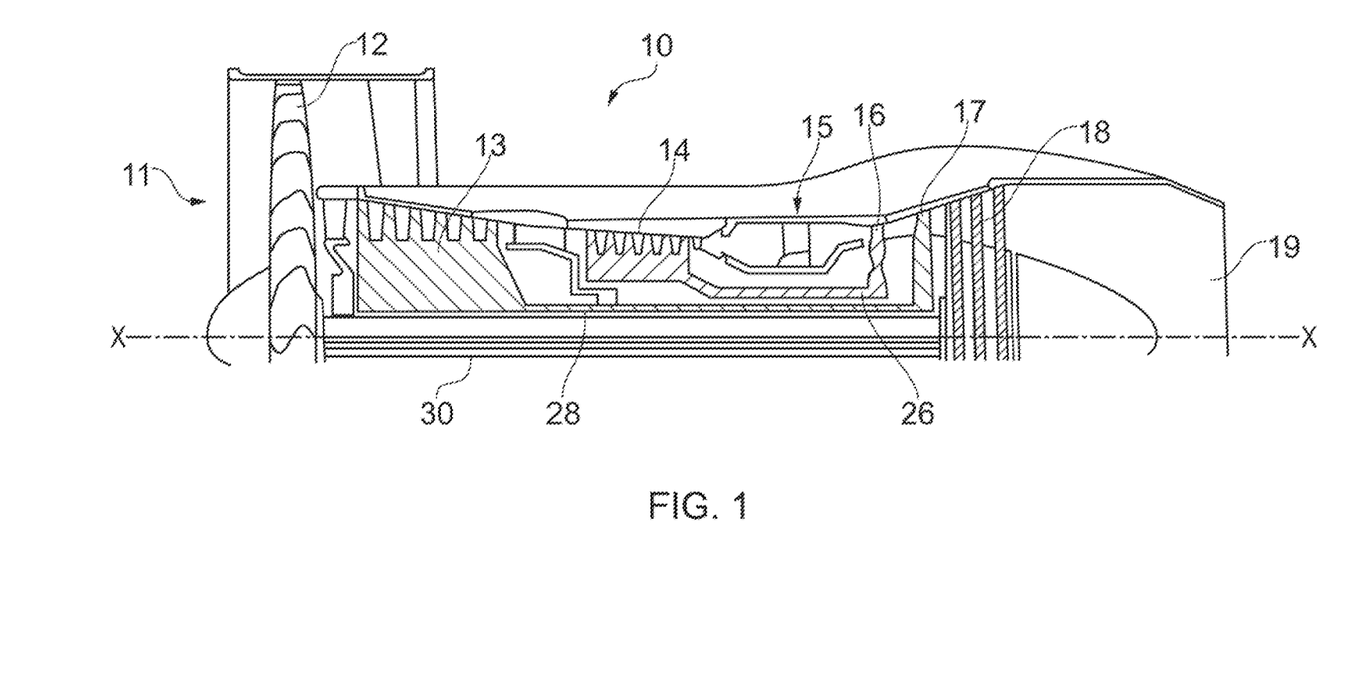
FIG. 1 is partially cut away view of a turbofan gas turbine engine having a combustion chamber arrangement according to the present disclosure.

A turbofan gas turbine engine 10, as shown in FIG. 1, comprises in flow series an intake 11, a fan 12, an intermediate pressure compressor 13, a high pressure compressor 14, a combustion chamber arrangement 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber arrangement 15. Fuel is injected into the combustion chamber arrangement 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
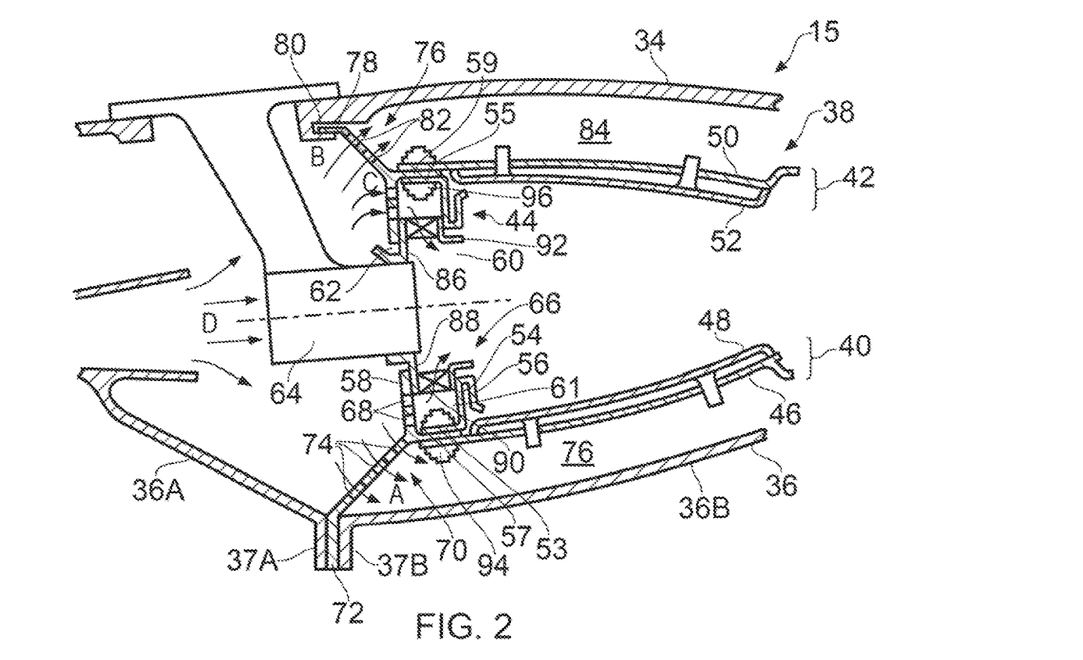
FIG. 2 is an enlarged cross-sectional view of a combustion chamber arrangement according to the present disclosure.
Figure 3:
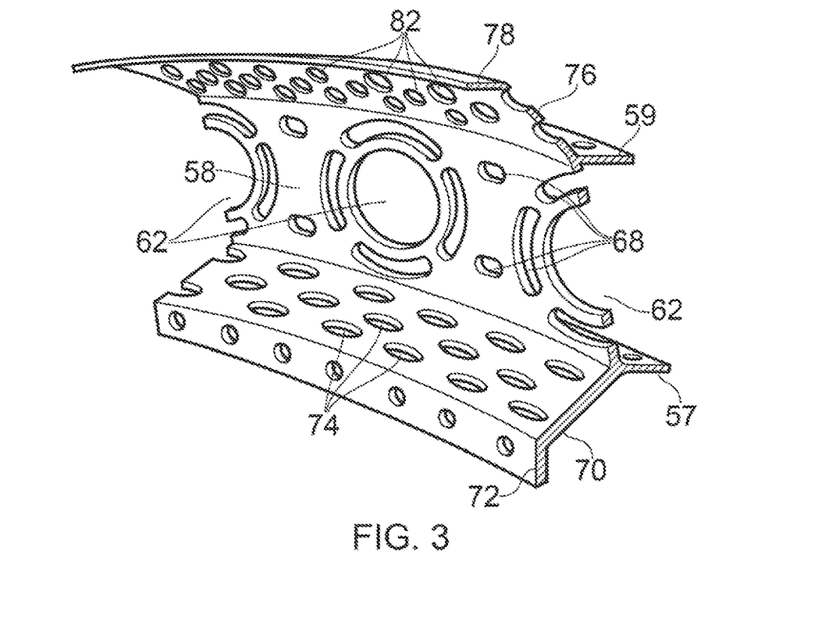
FIG. 3 is an enlarged perspective view of a metering wall of the combustion chamber arrangement shown in FIG. 2.

The combustion chamber arrangement 15 according to the present disclosure, as shown more clearly in FIGS. 2 and 3, comprises an outer casing 34, an inner casing 36 and an annular combustion chamber 38. The annular combustion chamber 38 is arranged radially between the inner casing 36 and the outer casing 34. The annular combustion chamber 38 comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The upstream end wall structure 44 comprises an upstream end wall 54 and a heat shield 56. The heat shield 56 is spaced axially downstream from the upstream end wall 54 and the upstream end wall 54 supports the heat shield 56.

The first and third walls 46 and 50 have apertures extending there-through to provide cooling air jets onto the facing surface of the second and fourth annular walls 48 and 52 respectively. The second annular wall 48 comprises a plurality of tiles, the third annular wall 52 comprises a plurality of tiles and the heat shield 56 comprises a plurality of heat shield tiles. The tiles of the second and fourth annular walls 48 and 52 may have pedestals extending from their surfaces nearest to the first and third annular walls 46 and 50 respectively such that they are impingement and convectively cooled and/or the tiles of the second and fourth annular walls 48 and 52 may have apertures extending there-through such that they are impingement and effusion cooled. The upstream end wall has apertures extending there-through to provide cooling air jets onto the upstream surface of the heat shield 56. The heat shield tiles may have apertures extending there-through such that they are impingement and effusion cooled and/or the heat shield tiles may also have pedestals extending in an upstream direction from their upstream surfaces such that they are impingement and convectively cooled.

The combustion chamber arrangement 38 also comprises an annular metering wall 58 arranged axially upstream of the upstream end wall 54 and an annular chamber 61 is defined between the metering wall 58 and the upstream end wall 54. The upstream end wall 54 has a plurality of circumferentially spaced apertures 60, the metering wall 58 has a plurality of circumferentially spaced apertures 62 and each aperture 62 in the metering wall 58 is aligned, e.g. coaxially aligned, with a respective one of the apertures 60 in the upstream end wall 54. The combustion chamber arrangement 38 also comprises a plurality of fuel injectors 64 and a plurality of radial flow air swirlers 66. The fuel injectors 64 are arranged to supply fuel into the annular combustion chamber 15 during operation of the gas turbine engine 10. The fuel injectors 64 may be lean burn fuel injectors or rich burn fuel injectors. Each fuel injector 64 is arranged in a respective one of the apertures 60 in the upstream end wall 54 and a respective one of the apertures 62 in the metering wall 58 and each radial flow air swirler 66 is aligned, preferably arranged coaxially, with a respective one of the fuel injectors 64. Each radial flow air swirler 66 is arranged axially between the upstream end wall 54 and the metering wall 58. The metering wall 58 has a plurality of metering holes 68 arranged to provide a controlled supply of air into the annular chamber 61 and then to each of the radial flow swirlers 66. The metering holes 68 may be circular in cross-section, may be slots, may be elongated or may be any other suitable shape. In particular each aperture 62 in the metering wall 58 has a plurality of elongate metering slots 68 extending circumferentially with respect to the axis of each aperture 62 and the elongate metering slots 68 are arranged at a radius greater than the outer radius of the associated radial flow swirler 66. Other metering holes 68 may be provided in the metering wall 58 which do not extend circumferentially with respect to the apertures 62 but may extend circumferentially with respect to the axis of the annular combustion chamber 38.

The annular combustion chamber 38 is secured to the inner casing 36 by a mounting feature 70 and in particular the metering wall 58 is secured to the inner casing 36 by the mounting feature 70 and the upstream end wall 54 is secured to the metering wall 58. The mounting feature 70 is annular and comprises an annular flange 72 to secure the annular combustion chamber 38 to the inner casing 36. The flange 72 extends generally radially relative to the axis of the annular combustion chamber 38 and inner casing 36 of the gas turbine engine 10. The flange 72 of the mounting feature 70 is trapped between, and secured to, a flange 37A on an upstream portion 36A of the inner casing 36 and a flange 37B on a downstream portion 36B of the inner casing 36. The mounting feature 70 has a plurality of metering apertures 74 to supply air to an annular chamber 76 between the inner casing 36 and the annular combustion chamber 38. The metering apertures 74 may be circular in cross-section, may be slots, may be elongated or any other suitable shape. The mounting feature 70 is arranged at an angle to the radial direction to increase the surface area of the mounting feature 70. Angling the mounting feature 70 enables more metering apertures 74 to be provided in the mounting feature 70. In this example the mounting feature 70 extends in an axially upstream direction and a radially inward direction from the metering wall 58 to the inner casing 36. The mounting feature 70 is arranged at an angle of about 40° to 50° to the radial direction, e.g. 45°, and is arranged at an angle of about 40° to 50° to the metering wall 58, e.g. 45°.

The annular combustion chamber 38 is secured to the outer casing 34 by a second mounting feature 76 and in particular the metering wall 58 is secured to the outer casing 34 by the second mounting feature 76 and the upstream end wall 54 is secured to the metering wall 58. The second mounting feature 76 is annular and comprises an annular flange 78 arranged to locate in an axial slot 80 in the outer casing 34 to allow relative axial movement, e.g. differential thermal axial growth, between the outer casing 34 and the annular combustion chamber 38. The flange 78 extends generally axially relative to the axis of the annular combustion chamber 38 and outer casing 34 of the gas turbine engine 10. The location of the flange 78 in the slot 80 also forms a seal between the outer casing 34 and the second mounting feature 76. The second mounting feature 76 also has a plurality of metering apertures 82 to supply air to an annular chamber 84 between the outer casing 34 and the annular combustion chamber 38. The metering apertures 82 may be circular in cross-section, may be slots, may be elongated or may be any other suitable shape. The second mounting feature 76 is also arranged at an angle to the radial direction to increase the surface area of the second mounting feature 76. Angling the second mounting feature 76 enables more metering apertures 82 to be provided in the second mounting feature 76. In this example the second mounting feature 76 extends in an axially upstream direction and a radially outward direction from the metering wall 58 to the outer casing 34. The second mounting feature 76 is arranged at an angle of about 40° to 50° to the radial direction, e.g. 45°, and is arranged at an angle of about 40° to 50° to the metering wall 58, e.g. 45°.

It is to be noted that the metering wall 58, the mounting feature 70 and the second mounting feature 76 are integral, e.g. one piece as shown more clearly in FIG. 3. The metering wall 58, the mounting feature 70 and the second mounting feature 76 form three baffle plates to control the flow of air to the chamber 76, the chamber 84 and the radial flow air swirlers 66 via the annular chamber 61.

The upstream end wall 54 has an inner axially extending flange 53 and an outer axially extending flange 55 and the flanges 53 and 55 extend in an upstream direction. The metering wall 58 has an inner axially extending flange 57 and an outer axially extending flange 59 and the flanges extend in a downstream direction. The first annular wall 46 of the inner annular wall structure 40 is secured to the inner axially extending flanges 53 and 57 of the upstream end wall 54 and the metering wall 58 respectively by fasteners, e.g. nuts and bolts, 94 and the third annular wall 50 of the outer annular wall structure 42 is secured to the outer axially extending flanges 55 and 59 of the upstream end wall 54 and the metering wall 58 respectively by fasteners, e.g. nuts and bolts, 96.

The annular combustion chamber 38 also comprises a plurality of sealing rings 86 and each fuel injector 64 locates in a respective one of the sealing rings 86. Each sealing ring 86 carries the associated radial flow air swirler 66 of the fuel injector 64. Each sealing ring 86 has a radially extending flange 88 and the upstream ends of the vanes 90 of the radial flow air swirler 66 are secured to the radially extending flange 88 of the sealing ring 86 and the downstream ends of the vanes 90 of the radial flow air swirler 66 are secured to an L-shaped member 92.

The present disclosure is particularly useful for lean burn fuel injectors 64 and provides a separate radial flow air swirler 66 for each fuel injector 64 and each radial flow air swirler 66 is precisely located relative to its associated fuel injector 64.

In operation the metering apertures 74, which are carefully dimensioned, in the mounting feature 70 accurately distribute the required amount of airflow A to the chamber 76 between the inner casing 36 and the annular combustion chamber 38 to provide the required amount of cooling air to the inner annular wall structure 40. The total cross-sectional area of the metering apertures 74 in the mounting feature 70 is selected to provide the required cooling airflow A to the chamber 76. Similarly the metering apertures 82, which are carefully dimensioned, in the second mounting feature 76 accurately distribute the required amount of airflow B to the chamber 84 between the outer casing 34 and the annular combustion chamber 38 to provide the required amount of cooling air to the outer annular wall structure 42. The total cross-sectional area of the metering apertures 82 in the second mounting feature 76 is selected to provide the required cooling airflow B to the chamber 84. The metering holes 68, which are carefully dimensioned, accurately distribute the required amount of airflow C to each of the radial flow air swirlers 66 and provide the required amount of cooling air for the upstream end wall 54 and heat shield 56 via the annular chamber 61. The total cross-sectional area of the metering holes 68 in the metering wall 58 is selected to provide the required airflow C to the annular chamber 61. The metering holes 68 provide a substantially uniform flow of air to each of the radial flow air swirlers 66 to ensure that a uniform flow of air is supplied by each of the radial flow swirlers to their respective fuel injector 64. The remaining airflow D is supplied to each of the fuel injectors 64 and the airflow D and the airflow C from the radial flow air swirlers 66 is used to provide uniform mixing of the fuel and air at each fuel injector 64 to provide lean burning of the fuel in the air in the annular combustion chamber 38. The required airflow A to the chamber 76 for the inner annular wall structure 40 is 5 to 20%, the required airflow B to the chamber 84 for the outer annular wall structure 42 is 5 to 20%, the required airflow C to the chamber 61 for the radial flow air swirlers 66 and upstream end wall 44 is 20 to 40% and the required airflow D to the fuel injectors, e.g. lean burn fuel injectors, 64 is 50 to 90%.

Figure 4:
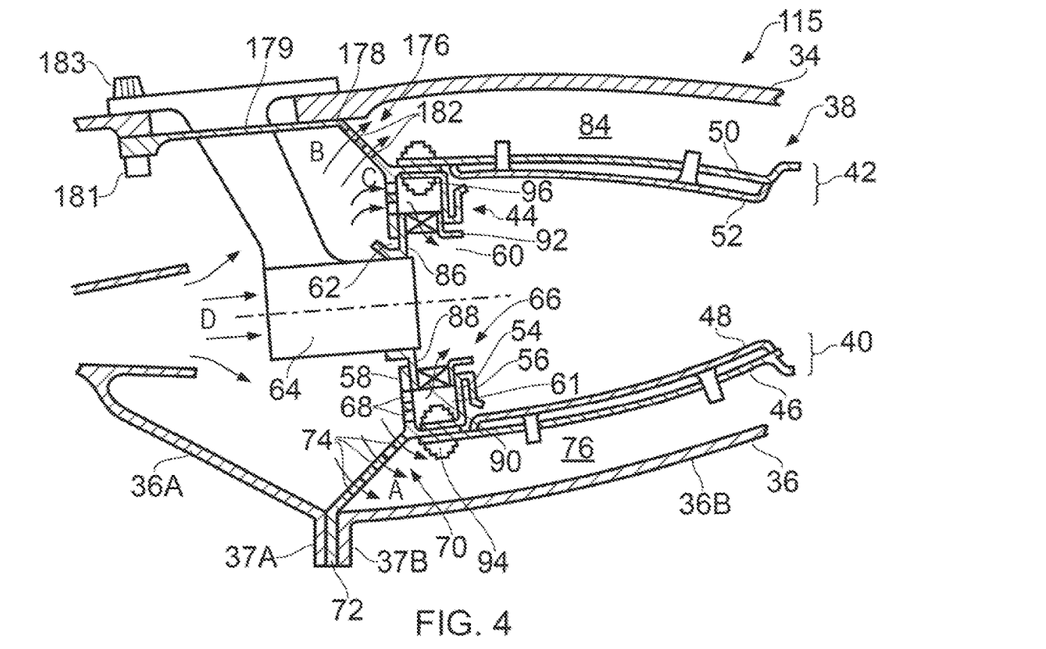
FIG. 4 is a further enlarged cross-sectional view of an alternative combustion chamber arrangement according to the present disclosure.
Figure 5:
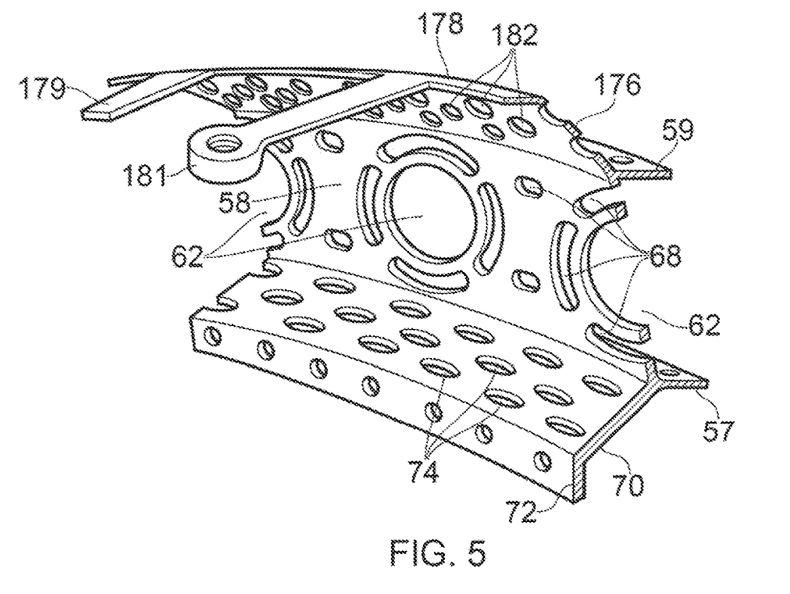
FIG. 5 is an enlarged perspective view of a metering wall of the combustion chamber arrangement shown in FIG. 4.

A further combustion chamber arrangement 115 according to the present disclosure, as shown more clearly in FIGS. 4 and 5, is substantially the same and works in substantially the same manner as that shown in FIGS. 2 and 3, and like parts are denoted by like numerals. However, the combustion chamber arrangement 115 differs in that it has a different second mounting feature 176.

The annular combustion chamber 38 is secured to the outer casing 34 by the second mounting feature 176 and in particular the metering wall 58 is secured to the outer casing 34 by the second mounting feature 176 and the upstream end wall 54 is secured to the metering wall 58. The second mounting feature 176 is annular and comprises an annular flange 178 arranged to abut the outer casing 34. The flange 178 extends generally axially relative to the axis of the annular combustion chamber 38 and the outer casing 34 of the gas turbine engine 10. The flange 178 has a plurality of circumferentially spaced members 179 extending in an axially upstream direction from the flange 178 and the members 179 have upstream ends 181, each of which is fastened to the outer casing 34 by fasteners 183, e.g. nuts and bolts. The members 179 are resilient and radially flexible and mount the annular combustion chamber 38 onto the outer casing 34 to allow relative radial and axial movement, e.g. differential thermal radial and axial growth, between the outer casing 34 and the annular combustion chamber 38. The second mounting feature 176 also has a plurality of metering apertures 182 to supply air to an annular chamber 84 between the outer casing 34 and the annular combustion chamber 38. The second mounting feature 176 is also arranged at an angle to the radial direction to increase the surface area of the second mounting feature 176. Angling the second mounting feature 176 enables more metering apertures 182 to be provided in the second mounting feature 176. In this example the second mounting feature 176 extends in an axially upstream direction and a radially outward direction from the metering wall 58 to the outer casing 34. The second mounting feature 176 is arranged at an angle of about 40° to 50° to the radial direction, e.g. 45°, and is arranged at an angle of about 40° to 50° to the metering wall 58, e.g. 45°. The second mounting feature 176 is annular and comprises the flange 178 and the plurality of axially extending flexible mounting members 179 secured to the outer casing 34.

It is to be noted that the metering wall 58, the mounting feature 70 and the second mounting feature 176 are integral, e.g. one piece as shown more clearly in FIG. 5. The metering wall 58, the mounting feature 70 and the second mounting feature 176 form three baffle plates to control the flow of air to the chamber 76, the chamber 84 and the radial flow air swirlers 66 via the annular chamber 61.

Figure 6:
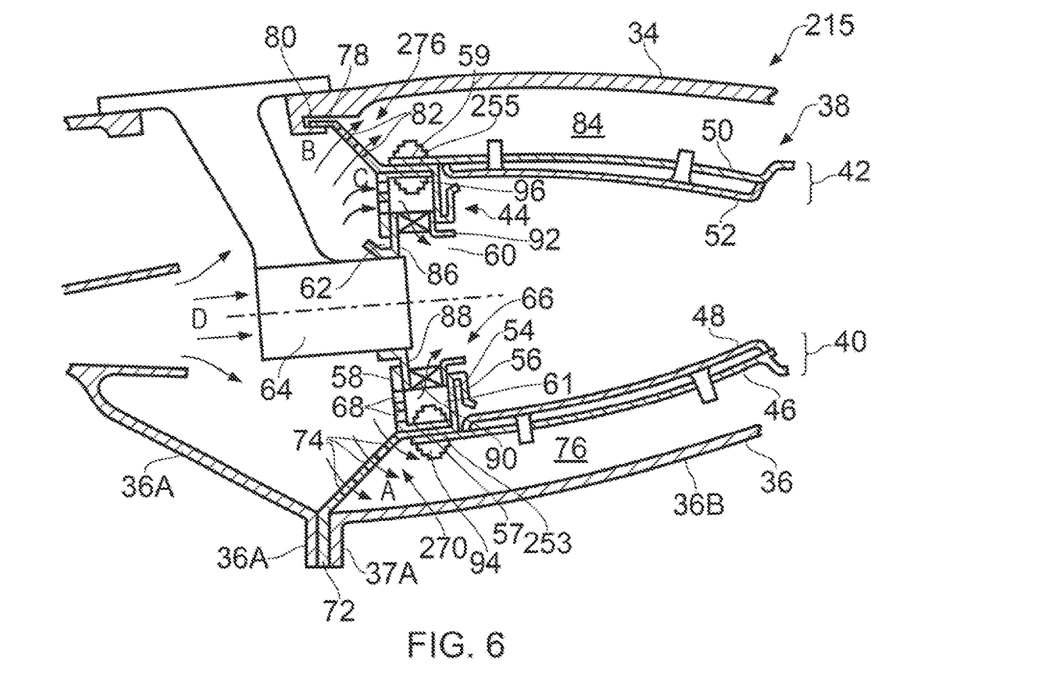
FIG. 6 is a further enlarged cross-sectional view of another alternative combustion chamber arrangement according to the present disclosure.
Figure 7:
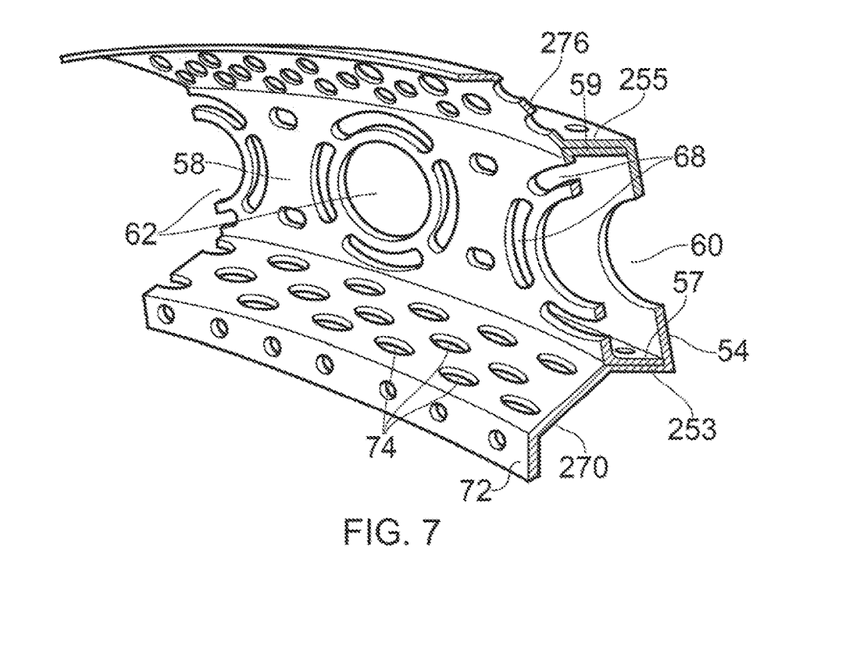
FIG. 7 is an enlarged perspective view of a metering wall of the combustion chamber arrangement shown in FIG. 6.

Another combustion chamber arrangement 215 according to the present disclosure, as shown more clearly in FIGS. 6 and 7, is substantially the same and works in substantially the same manner as that shown in FIGS. 2 and 3, and like parts are denoted by like numerals. However, the combustion chamber arrangement 215 differs in that the annular combustion chamber 38 is secured to the inner casing 36 by a mounting feature 270 and in particular the upstream end wall 58 is secured to the inner casing 36 by the mounting feature 270 and the metering wall 58 is secured to the upstream end wall 54. The mounting feature 270 is annular and comprises an annular flange 72 to secure the annular combustion chamber 38 to the inner casing 36. The flange 72 extends generally radially relative to the axis of the annular combustion chamber 38 and inner casing 36 of the gas turbine engine 10. The flange 72 of the mounting feature 270 is trapped between, and secured to, a flange 37A on an upstream portion 36A of the inner casing 36 and a flange 37B on a downstream portion 36B of the inner casing 36. The mounting feature 270 has a plurality of metering apertures 74 to supply air to an annular chamber 76 between the inner casing 36 and the annular combustion chamber 38. The mounting feature 270 is arranged at an angle to the radial direction to increase the surface area of the mounting feature 270. Angling the mounting feature 270 enables more metering apertures 74 to be provided in the mounting feature 270. In this example the mounting feature 270 extends in an axially upstream direction and a radially inward direction from the metering wall 58 to the inner casing 36. The mounting feature 270 is arranged at an angle of about 40° to 50° to the radial direction, e.g. 45°, and is arranged at an angle of about 40° to 50° to the metering wall 58, e.g. 45°.

The annular combustion chamber 38 is secured to the outer casing 34 by a second mounting feature 276 and in particular the upstream end wall 54 is secured to the outer casing 34 by the second mounting feature 276 and the metering wall 58 is secured to the upstream end wall 54. The second mounting feature 276 is annular and comprises an annular flange 78 arranged to locate in an axial slot 80 in the outer casing 34 to allow relative axial movement, e.g. differential thermal axial growth, between the outer casing 34 and the annular combustion chamber 38. The flange 78 extends generally axially relative to the axis of the annular combustion chamber 38 and outer casing 34 of the gas turbine engine 10. The location of the flange 78 in the slot 80 also forms a seal between the outer casing 34 and the second mounting feature 276. The second mounting feature 276 also has a plurality of metering apertures 82 to supply air to an annular chamber 84 between the outer casing 34 and the annular combustion chamber 38. The second mounting feature 276 is also arranged at an angle to the radial direction to increase the surface area of the second mounting feature 276. Angling the second mounting feature 276 enables more metering apertures 82 to be provided in the second mounting feature 276. In this example the second mounting feature 276 extends in an axially upstream direction and a radially outward direction from the metering wall 58 to the outer casing 34. The second mounting feature 276 is arranged at an angle of about 40° to 50° to the radial direction, e.g. 45°, and is arranged at an angle of about 40° to 50° to the metering wall 58, e.g. 45°.

It is to be noted that the upstream end wall 54, the mounting feature 270 and the second mounting feature 276 are integral, e.g. one piece as shown more clearly in FIG. 7. The metering wall 58, the mounting feature 270 and the second mounting feature 276 form three baffle plates to control the flow of air to the chamber 76, the chamber 84 and the radial flow air swirlers 66 via the chamber 61.

The upstream end wall 54 has an inner axially extending portion 253 and an outer axially extending portion 255 and the portions 253 and 255 extend in an upstream direction. The metering wall 58 has an inner axially extending flange 57 and an outer axially extending flange 59 and the flanges extend in a downstream direction. The first annular wall 46 of the inner annular wall structure 40 is secured to the inner axially portion 253 and the axially extending flange 57 of the upstream end wall 54 and the metering wall 58 respectively by fasteners, e.g. nuts and bolts, 94 and the third annular wall 50 of the outer annular wall structure 42 is secured to the outer axially extending portion 255 and 59 of the upstream end wall 54 and the metering wall 58 respectively by fasteners, e.g. nuts and bolts, 96. The mounting feature 270 is secured to the upstream end of the inner axially extending portion 253 and the second mounting feature 276 is secured to the upstream end of the outer axially extending portion 255.

Figure 8:
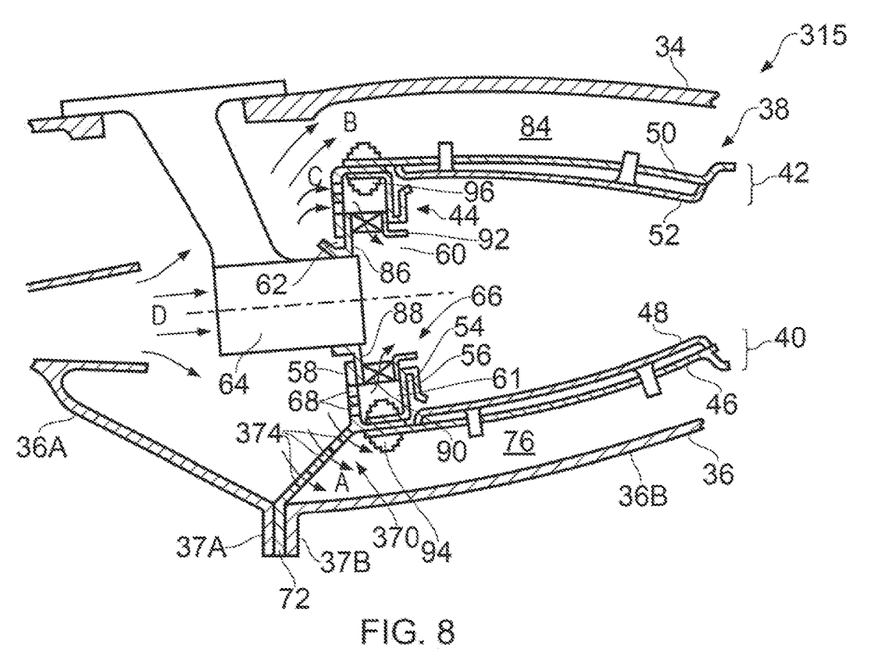
FIG. 8 is a further enlarged cross-sectional view of an additional combustion chamber arrangement according to the present disclosure.
Figure 9:
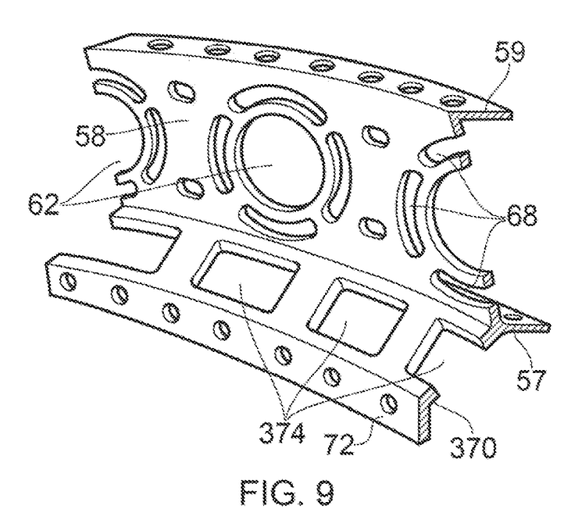
FIG. 9 is an enlarged perspective view of an upstream end wall of the combustion chamber arrangement shown in FIG. 8.

An additional combustion chamber arrangement 315 according to the present disclosure, as shown more clearly in FIGS. 8 and 9, is substantially the same and works in substantially the same manner as that shown in FIGS. 2 and 3, and like parts are denoted by like numerals. However, the combustion chamber arrangement 315 differs in that it only has a mounting feature 370 and does not have a second mounting feature. The mounting feature 370 has metering apertures 374 which have relatively large dimensions in order to provide little restriction to the airflow A to the chamber 76 and there is no restriction to the airflow B to the chamber 84. However, this arrangement is not preferred because it does not accurately control the airflow to the chamber 76 and the chamber 84 and hence control the cooling airflow to the inner annular wall structure 40 and the outer annular wall structure 42.

Figure 10:
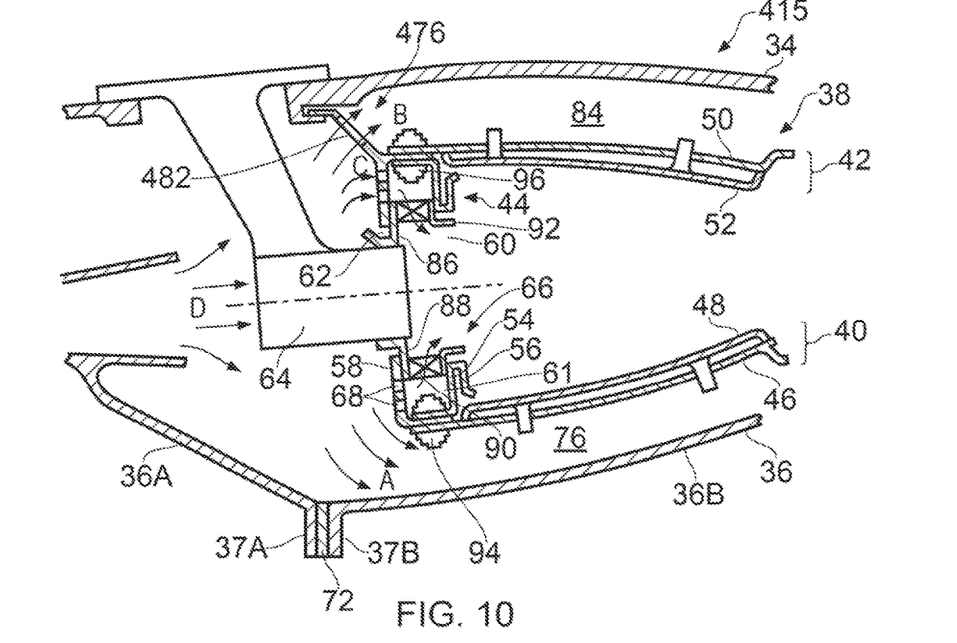
FIG. 10 is a further enlarged cross-sectional view of an additional combustion chamber arrangement according to the present disclosure.
Figure 11:
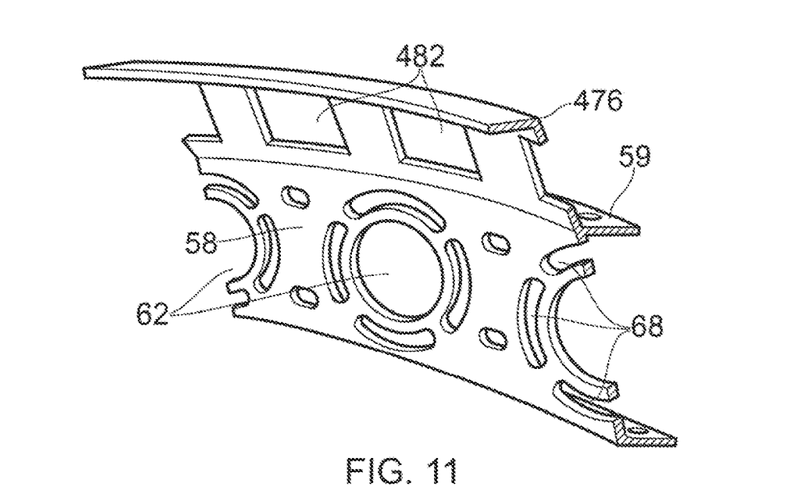
FIG. 11 is an enlarged perspective view of an upstream end wall of the combustion chamber arrangement shown in FIG. 10.

Another combustion chamber arrangement 415 according to the present disclosure, as shown more clearly in FIGS. 10 and 11, is substantially the same and works in substantially the same manner as that shown in FIGS. 2 and 3, and like parts are denoted by like numerals. However, the combustion chamber arrangement 415 differs in that it only has a mounting feature 476. The mounting feature 476 has metering apertures 482 which have relatively large dimensions in order to provide little restriction to the airflow B to the chamber 84 and there is no restriction to the airflow A to the chamber 76. However, this arrangement is not preferred because it does not accurately control the airflow to the chamber 84 and the chamber 76 and hence control the cooling airflow to the inner annular wall structure 40 and the outer annular wall structure 42.

In addition it may be possible to use the second mounting feature shown in FIGS. 4 and 5 as the second mounting feature in the combustion chamber arrangement of FIGS. 6 and 7. It may be possible to use the single mounting feature shown in FIGS. 8 and 9 as single mounting feature in the combustion chamber arrangement of FIGS. 6 and 7.

A further alternative combustion chamber arrangement, similar to that shown in FIGS. 4 and 5, provides the flange of the second mounting feature with a plurality of circumferentially spaced U-shaped members extending in an axially upstream direction from the flange and the U-shaped members have upstream ends, each of which is fastened to the outer casing by fasteners, e.g. nuts and bolts or the flange of the second mounting feature has a single annular U-shaped member extending in an axially upstream direction from the flange and the U-shaped member has upstream end which is fastened to the outer casing by fasteners, e.g. nuts and bolts, similarly to our U.S. Pat. No. 4,487,015.

Additionally although the examples have provided the mounting feature, or the mounting feature and the second mounting, integral, e.g. one piece, with the metering wall or upstream end wall it may be equally possible to provide a separate mounting feature, or a separate mounting feature and a separate second mounting feature, and secure the mounting feature, or separate mounting feature and separate second mounting feature, to the associated flanges on the upstream end wall and metering wall.

Advantages of the present disclosure are that the metering wall incorporates an array of apertures, the array of apertures comprises an appropriate number of apertures which have accurate dimensions to provide a total cross-sectional area adequate to ensure optimum, maximum, airflow uniformity to each of the radial flow air swirlers, e.g. each radial air flow swirler is supplied with the same amount of air. This enables optimum circumferential fuel and air distribution to be achieved from lean burn fuel injectors to provide an optimum, maximum, reduction in NOx production in the annular combustion chamber. The present disclosure provides mounting features each of which incorporates an array of apertures. The array of apertures in each mounting feature comprises an appropriate number of apertures which have accurate dimensions to provide a total cross-sectional area adequate to ensure optimum, minimum, airflow to cool the inner and outer annular wall structures respectively. The mounting features enable the annular combustion chamber to be mounted at its upstream end whilst achieving an optimum circumferential fuel and air distribution to be achieved from lean burn fuel injectors to provide an optimum, maximum, reduction in NOx production in the annular combustion chamber. The mounting feature which is fastened to the inner casing ensures that exact axial alignment of each fuel injector and its associated separate radial flow air swirler is maintained. The use of the metering wall dispenses with the need for a conventional domed combustion chamber dump diffuser head cowling and hence reduces the weight, length and cost of the combustion chamber system. The one piece metering wall and mounting features or the separate metering wall and mounting features may be constructed from sheet metal or by additive layer manufacture, e.g. laser powder bed or direct laser deposition or selective laser sintering etc, rather than by casting. The metering wall and mounting features may comprise a superalloy, e.g. nickel superalloy, cobalt superalloy or iron superalloy.

The present disclosure provides the outer swirler, the radial flow swirler, for lean burn combustion on the combustion chamber and reduces the diameter of the lean burn fuel injector and enables smaller diameter apertures to be provided in the upstream end wall of the combustion chamber. Thus, the lean burn fuel injectors generally comprise three, or four, coaxial air swirlers to atomise a pilot fuel supply and a main fuel supply.

Although the present disclosure has referred to radially inner and radially outer annular wall structures each having a double wall structure comprising tiles it is equally possible for each of the radially inner and radially outer annular wall structures to simply comprise a single wall structure.

Although the present disclosure has referred to a combustion chamber arrangement for a gas turbine engine it may be possible to use the combustion chamber arrangement for other suitable turbomachines etc.

Although the present disclosure has referred to a turbofan gas turbine engine it is also applicable to other aero gas turbine engines, e.g. a turbo propeller gas turbine engine, a turbo shaft gas turbine engine or a turbojet gas turbine engine.

Although the present disclosure has referred to an aero gas turbine engine it is equally applicable to a marine gas turbine engine, an industrial gas turbine engine or an automotive gas turbine engine.

The invention claimed is:

1. A combustion chamber arrangement comprising:
an outer casing;
an inner casing;
an annular combustion chamber; and
a heat shield, wherein:
the annular combustion chamber is arranged radially between the inner casing and the outer casing,
the annular combustion chamber comprises an inner annular wall, an outer annular wall, an upstream end wall, a plurality of fuel injectors, a metering wall and a plurality of air swirlers,
the metering wall is arranged upstream of the upstream end wall,
the upstream end wall has a first plurality of circumferentially spaced apertures,
the metering wall has a second plurality of circumferentially spaced apertures,
each of the second plurality of circumferentially spaced apertures in the metering wall is aligned with a respective one of the first plurality of circumferentially spaced apertures in the upstream end wall,
each of the plurality of fuel injectors is arranged in the respective one of the first plurality of circumferentially spaced apertures in the upstream end wall,
each air swirler of the plurality of air swirlers is aligned with a respective one of the plurality of fuel injectors,
each air swirler of the plurality of air swirlers is arranged axially between the upstream end wall and the metering wall, the metering wall having a plurality of metering holes arranged to provide a controlled supply of air to each air swirler of the plurality of air swirlers,
the annular combustion chamber is secured to the inner casing or the outer casing by a first mounting feature,
the annular combustion chamber is mounted at an upstream end of the annular combustion chamber,
one of the upstream end wall and the metering wall is secured to the inner casing or the outer casing by the first mounting feature,
the first mounting feature is annular,
the first mounting feature has a plurality of metering apertures to supply air to a first annular chamber between the inner casing and the annular combustion chamber or to a second annular chamber between the outer casing and the annular combustion chamber,
the heat shield is arranged downstream of the upstream end wall,
the upstream end wall supports the heat shield, and
the first mounting feature comprises a baffle plate.

2. The combustion chamber arrangement as claimed in claim 1 wherein the annular combustion chamber comprises a plurality of sealing rings, each fuel injector of the plurality of fuel injectors locating in and abutting a respective one of the plurality of sealing rings, each sealing ring of the plurality of sealing rings carrying a respective associated air swirler of the plurality of air swirlers.

3. The combustion chamber arrangement as claimed in claim 2 wherein each air swirler of the plurality of air swirlers is a radial flow air swirler.

4. The combustion chamber arrangement as claimed in claim 3 wherein each sealing ring of the plurality of sealing rings has a radially extending flange and an upstream end of vanes of the radial flow air swirler being secured to the radially extending flange of each sealing ring of the plurality of sealing rings and the downstream ends of the vanes of the radial flow air swirler being secured to an L-shaped member.

5. The combustion chamber arrangement as claimed in claim 1 wherein the upstream end wall is secured to the inner casing by the first mounting feature and the metering wall being secured to the upstream end wall.

6. The combustion chamber arrangement as claimed in claim 1 wherein the metering wall is secured to the inner casing by the first mounting feature and the upstream end wall being secured to the metering wall.

7. The combustion chamber arrangement as claimed in claim 5 wherein the first mounting feature is annular and comprises a flange to secure the annular combustion chamber to the inner casing.

8. The combustion chamber arrangement as claimed in claim 1 wherein the first mounting feature is arranged at an angle to a radial direction to increase the surface area of the first mounting feature.

9. The combustion chamber arrangement as claimed in claim 1 wherein the annular combustion chamber is secured to the outer casing by a second mounting feature.

10. The combustion chamber arrangement as claimed in claim 9 wherein the upstream end wall is directly secured to the outer casing by the second mounting feature and the metering wall is directly secured to the upstream end wall.

11. The combustion chamber arrangement as claimed in claim 9 wherein the metering wall is directly secured to the outer casing by the second mounting feature and the upstream end wall is directly secured to the metering wall.

12. The combustion chamber arrangement as claimed in claim 9 wherein the second mounting feature is annular and comprises a flange arranged to locate in an axial slot in the outer casing to allow relative axial movement between the outer casing and the annular combustion chamber.

13. The combustion chamber arrangement as claimed in claim 12 wherein the second mounting feature has a second plurality of metering apertures to supply air to the second annular chamber.

14. The combustion chamber arrangement as claimed in claim 13 wherein the second mounting feature is arranged at an angle to a radial direction to increase a surface area of the second mounting feature.

15. The combustion chamber arrangement as claimed in claim 9 wherein the second mounting feature is annular and comprises a flange and a plurality of axially extending flexible mounting members secured to the outer casing, the flange is arranged to abut the outer casing, and at least one of the plurality of axially extending flexible mounting members has remote ends secured to the outer casing.

16. The combustion chamber arrangement as claimed in claim 5 wherein the upstream end wall and the first mounting feature are integral or the metering wall and the first mounting feature are integral.

17. The combustion chamber arrangement as claimed in claim 9 wherein the upstream end wall, the first mounting feature and the second mounting feature are integral or the metering wall, the first mounting feature and the second mounting feature are integral.

18. The combustion chamber arrangement as claimed in claim 1 wherein the upstream end wall has a first inner axially extending flange and a first outer axially extending flange, the metering wall has a second inner axially extending flange and a second outer axially extending flange, the inner annular wall being secured to the first inner axially extending flange of the upstream end wall, the second inner axially extending flange of the metering wall and the outer annular wall being secured to the first outer axially extending flange of the upstream end wall and the second outer axially extending flange of the metering wall.

19. The combustion chamber arrangement as claimed in claim 1 wherein the plurality of fuel injectors are lean burn fuel injectors, the lean burn fuel injectors comprising three or four coaxial air swirlers to atomize a pilot fuel supply and a main fuel supply.

20. The combustion chamber arrangement as claimed in claim 1 wherein the one of the upstream end wall and the metering wall is directly secured to the inner casing or the outer casing by the first mounting feature.

21. The combustion chamber arrangement as claimed in claim 4 wherein the radially extending flange of each sealing ring of the plurality of sealing rings is arranged between the upstream end wall and the metering wall.

22. A combustion chamber arrangement comprising:
an outer casing;
an inner casing;
an annular combustion chamber; and
a heat shield, wherein:
the annular combustion chamber is arranged radially between the inner casing and the outer casing,
the annular combustion chamber comprises an inner annular wall, an outer annular wall, an upstream end wall, a plurality of fuel injectors, a metering wall and a plurality of air swirlers,
the metering wall is arranged upstream of the upstream end wall,
the upstream end wall has a first plurality of circumferentially spaced apertures,
the metering wall has a second plurality of circumferentially spaced apertures,
each of the second plurality of circumferentially spaced apertures in the metering wall is aligned with a respective one of the first plurality of circumferentially spaced apertures in the upstream end wall,
each of the plurality of fuel injectors is arranged in the respective one of the first plurality of circumferentially spaced apertures in the upstream end wall,
each air swirler of the plurality of air swirlers is aligned with a respective one of the plurality of fuel injectors,
each air swirler of the plurality of air swirlers is arranged axially between the upstream end wall and the metering wall, the metering wall having a plurality of metering holes arranged to provide a controlled supply of air to each air swirler of the plurality of air swirlers,
the annular combustion chamber is secured to the inner casing or the outer casing by a first mounting feature,
the annular combustion chamber is mounted at an upstream end of the annular combustion chamber,
one of the upstream end wall and the metering wall is secured to the inner casing or the outer casing by the first mounting feature,
the first mounting feature is annular,
the first mounting feature has a plurality of metering apertures to supply air to a first annular chamber between the inner casing and the annular combustion chamber or to a second annular chamber between the outer casing and the annular combustion chamber,
the heat shield is arranged downstream of the upstream end wall,
the upstream end wall supports the heat shield,
the annular combustion chamber comprises a plurality of sealing rings, each fuel injector of the plurality of fuel injectors locating in and abutting a respective one of the plurality of sealing rings, each sealing ring of the plurality of sealing rings carrying a respective associated air swirler of the plurality of air swirlers,
each air swirler of the plurality of air swirlers is a radial flow air swirler,
each sealing ring of the plurality of sealing rings has a radially extending flange and an upstream end of vanes of the radial flow air swirler being secured to the radially extending flange of each sealing ring of the plurality of sealing rings and the downstream ends of the vanes of the radial flow air swirler being secured to an L-shaped member, and
the radially extending flange of each sealing ring abuts the metering wall and the L-shaped member abuts the upstream end wall.

23. A combustion chamber arrangement comprising:
an outer casing;
an inner casing;
an annular combustion chamber; and
a heat shield, wherein:
the annular combustion chamber is arranged radially between the inner casing and the outer casing,
the annular combustion chamber comprises an inner annular wall, an outer annular wall, an upstream end wall, a plurality of fuel injectors, a metering wall and a plurality of air swirlers,
the metering wall is arranged upstream of the upstream end wall,
the upstream end wall has a first plurality of circumferentially spaced apertures,
the metering wall has a second plurality of circumferentially spaced apertures,
each of the second plurality of circumferentially spaced apertures in the metering wall is aligned with a respective one of the first plurality of circumferentially spaced apertures in the upstream end wall,
each of the plurality of fuel injectors is arranged in the respective one of the first plurality of circumferentially spaced apertures in the upstream end wall,
each air swirler of the plurality of air swirlers is aligned with a respective one of the plurality of fuel injectors,
each air swirler of the plurality of air swirlers is arranged axially between the upstream end wall and the metering wall, the metering wall having a plurality of metering holes arranged to provide a controlled supply of air to each air swirler of the plurality of air swirlers,
the annular combustion chamber is secured to the inner casing or the outer casing by a first mounting feature,
the annular combustion chamber is mounted at an upstream end of the annular combustion chamber,
one of the upstream end wall and the metering wall is secured to the inner casing or the outer casing by the first mounting feature,
the first mounting feature is annular,
the first mounting feature has a plurality of metering apertures to supply air to a first annular chamber between the inner casing and the annular combustion chamber or to a second annular chamber between the outer casing and the annular combustion chamber,
the heat shield is arranged downstream of the upstream end wall,
the upstream end wall supports the heat shield,
the plurality of metering holes of the metering wall comprise elongate metering slots extending circumferentially with respect to each aperture of the second plurality of circumferentially spaced apertures in the metering wall, the elongate metering slots are arranged at a radius greater than an outer radius of an associated radial flow swirler with respect to an axis of the respective aperture of the second plurality of circumferentially spaced apertures in the metering wall.

* * * * *